April 12, 1932.  I. MORIOKA  1,853,072
METHOD OF CHANGING THE RATIO OF WIDTH TO HEIGHT OF AN IMAGE
Filed June 29, 1928
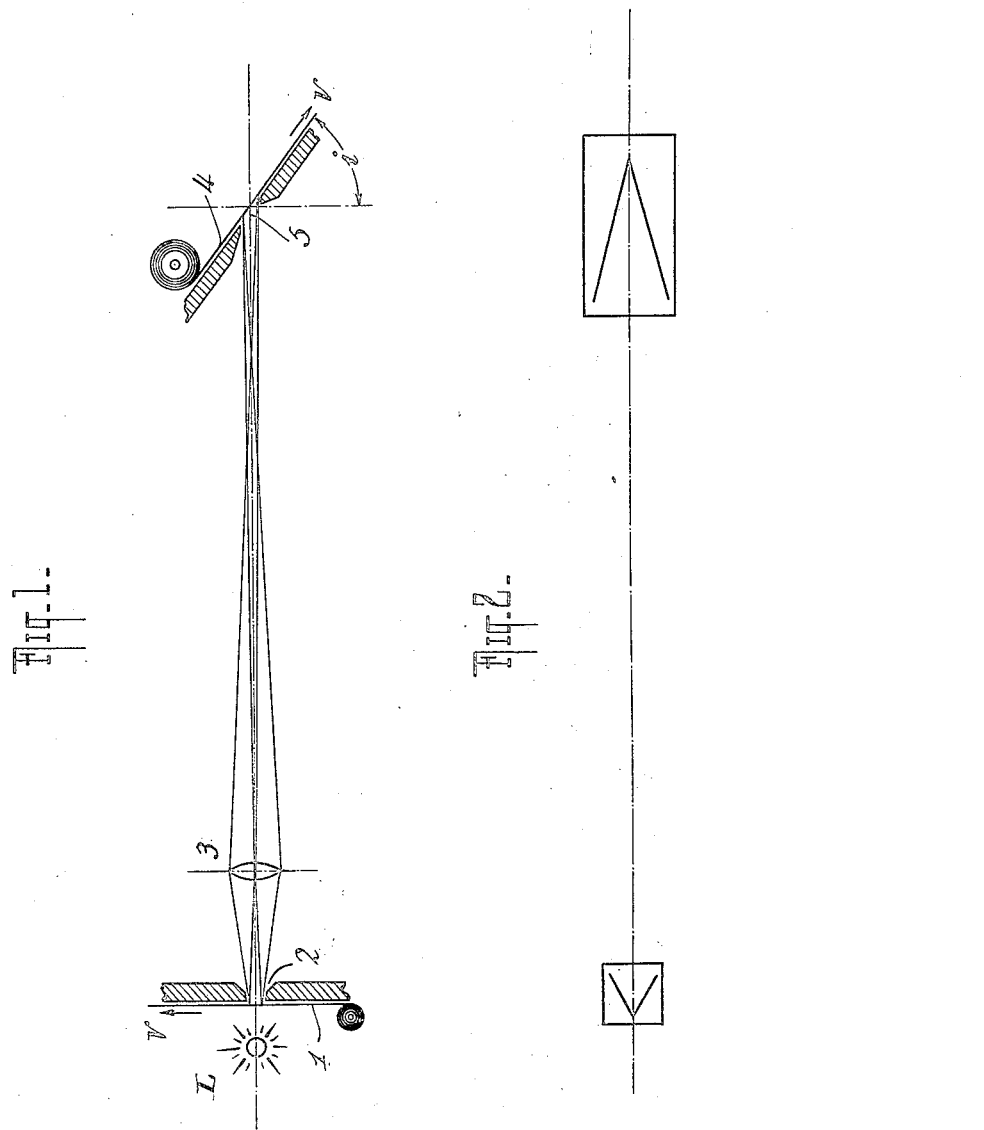
INVENTOR
ISAO MORIOKA
BY
ATTORNEYS Patented Apr. 12, 1932

1,853,072

UNITED STATES PATENT OFFICE

ISAO MORIOKA, OF TOKYO, JAPAN

METHOD OF CHANGING THE RATIO OF WIDTH TO HEIGHT OF AN IMAGE

Application filed June 29, 1928, Serial No. 289,194, and in Japan March 29, 1928.

This invention relates to improvements in optical method of changing the ratio of lateral to longitudinal dimensions of an image.

In a photographic reproduction of an object in three dimensions, such as described in my United States Patent No. 1,719,483, issued July 2, 1929, the photographic images taken at a definite acute angle to the plane of light rays projected on to the object to be reproduced have to be reduced to the images that would be produced if they were taken at right angles to the plane of light rays and if they were photographed free of obstructions. The present invention specifically, though not exclusively, relates to a method of carrying out such a reduction.

According to my invention, the images, for which non-uniform magnification is desired in respect of two dimensions, are projected to a plane inclined to the plane of the original images at a certain angle according to the desired magnification in one direction. In the case of the three-dimensional photographic reproduction above referred to, this angle of inclination is complementary to the acute angle at which the original images have been taken, relative to the plane of light rays projected on the object to be reproduced. In a practical execution of the invention, in case of the original images being taken on a film or a band, the film or the band is made to travel at a certain speed in front of a straight slit illuminated by a source of light, and the images projected on to a photographic film inclined at a specified angle with respect to the first named film or band.

For a better understanding of my invention, reference may now be had to the accompanying drawings forming a part of this specification, of which:

Figure 1 shows in a diagrammatic manner a plan view of an arrangement for carrying out the invention;

Figure 2 shows an image to be non-uniformly magnified and an image magnified according to the invention.

In Figure 1, 1 is a film or a band with an image or images, of which non-uniform magnification is desired. This film or band is illuminated by any suitable source of light L and caused to travel at a certain speed in one direction or the other as indicated by the arrow head $v$. The image is projected through a narrow slit 2, with the help of a lens 3, on to a photographic film 4 disposed so as to be inclined at a specified predetermined angle with respect to the film 1 and the film 4 is driven at a speed $v'$ which is equal to that of the film 1 increased by the secant of the angle of inclination between the two films, the rays of light falling on the photographic film through the slit 5. In this manner, the image taken on the film 4 will be magnified in the inverse ratio as the cosine of the angle of inclination $i$ as shown in Figure 2. In this example, the angle has been taken as 60°, and the magnification in the horizontal direction is twice as much as the magnification in the vertical direction.

What I claim is:—

In the photographic reproduction of a three-dimensional object, especially for films, the method of reducing foreshortened images to the corresponding profiles as viewed at right angles, this rate of magnification being the same throughout the method, consisting in causing a film bearing a plurality of foreshortened images and properly illuminated by means of a fixed source of light to move in front of a fixed slit and projecting said images by means of a fixed objective through another fixed slit on to a second moving photographic film, the second-mentioned slit acting as a screen to prevent a harmful reflection of light from falling on the second-mentioned film and disposed close to and in front of the second-mentioned film, the latter being positioned at an inclination with respect to the first-mentioned film bearing the images and causing the second-mentioned film to travel at a speed inversely proportional to the cosine of the angle of said inclination and in opposite sense to the travel of the first-mentioned film.

In testimony whereof I have affixed my signature.

ISAO MORIOKA.